US011951876B2

(12) United States Patent
    Okabe et al.

(10) Patent No.:     US 11,951,876 B2
(45) Date of Patent:        Apr. 9, 2024

(54) MULTIPURPOSE WORK VEHICLE

(71) Applicant: Kubota Corporation, Osaka (JP)

(72) Inventors: Kensuke Okabe, Sakai (JP); Kohta Nakao, Sakai (JP); Yusuke Endo, Sakai (JP)

(73) Assignee: Kubota Corporation, Osaka (JP)

( * ) Notice: Subject to any disclaimer, the term of this patent is extended or adjusted under 35 U.S.C. 154(b) by 163 days.

(21) Appl. No.: 16/891,269

(22) Filed: Jun. 3, 2020

(65) Prior Publication Data
    US 2021/0078449 A1    Mar. 18, 2021

(30) Foreign Application Priority Data
    Sep. 18, 2019  (JP) .................... 2019-169569

(51) Int. Cl.
    *B60N 2/01*   (2006.01)
    *B60N 2/38*   (2006.01)
    *B60N 2/64*   (2006.01)
(52) U.S. Cl.
    CPC ............ *B60N 2/01* (2013.01); *B60N 2/38* (2013.01); *B60N 2/643* (2013.01)
(58) Field of Classification Search
    CPC .......... B60N 2/01; B60N 2/005; B60N 2/643; B60N 2/38; B60N 2/3056; B60N 2/3061; B60N 2/3072
    USPC ..................... 296/64, 65.01, 65.13
    See application file for complete search history.

(56) References Cited

U.S. PATENT DOCUMENTS

| 1,267,736 A | * | 5/1918 | Name not available | |
| | | | | B60J 7/1855 |
| | | | | 296/64 |
| 2,839,312 A | * | 6/1958 | Barenyi ............ | B62D 1/18 |
| | | | | 296/64 |
| 2,980,466 A | * | 4/1961 | Barenyi ............ | B60R 5/00 |
| | | | | 296/37.16 |
| 3,352,597 A | * | 11/1967 | Barenyi ........... | B60N 2/01 |
| | | | | 296/64 |
| 5,538,309 A | * | 7/1996 | Murray ............ | B60J 5/0473 |
| | | | | 296/64 |
| 7,037,236 B2 | * | 5/2006 | Ishibashi .......... | F16H 61/439 |
| | | | | 477/52 |

(Continued)

FOREIGN PATENT DOCUMENTS

| DE | 815608 | 10/1951 | |
| DE | 815608 C | * 10/1951 | ............... B60N 2/01 |

(Continued)

OTHER PUBLICATIONS

Rademacher Wolfgang, Machine Translation of DE 815608 "Bench for passenger cars for three or more people", IP.com, Oct. 4, 1951 (Year: 1951).*

(Continued)

*Primary Examiner* — Amy R Weisberg
*Assistant Examiner* — Wenwei Zhuo
(74) *Attorney, Agent, or Firm* — The Webb Law Firm

(57) ABSTRACT

A multipurpose work vehicle according to one or more embodiments of the present invention includes a driver's seat at the center of a vehicle body in the left-right direction of the vehicle body; and an occupant's seat to the left or right of the driver's seat in the left-right direction of the vehicle body, wherein the occupant's seat is offset rearwardly relative to the driver's seat.

10 Claims, 6 Drawing Sheets

(56) References Cited

U.S. PATENT DOCUMENTS

| | | | | |
|---|---|---|---|---|
| 8,480,538 B2* | 7/2013 | Gillingham | .......... | B60K 17/356 |
| | | | | 477/10 |
| 9,174,686 B1* | 11/2015 | Messina | ................ | B62D 33/04 |
| 9,475,413 B2* | 10/2016 | Hayashi | ................ | B60N 2/803 |
| 9,616,844 B2* | 4/2017 | Karube | ................ | B60R 22/24 |
| 9,707,869 B1 | 7/2017 | Messina et al. | | |
| 9,932,073 B2* | 4/2018 | Dube | ................... | B60K 13/02 |
| 2005/0116517 A1* | 6/2005 | Fujihara | ................. | B60N 2/36 |
| | | | | 297/243 |
| 2009/0239706 A1* | 9/2009 | Ishida | ................. | F16H 61/448 |
| | | | | 477/40 |
| 2012/0056411 A1* | 3/2012 | Nakamura | ........... | B62D 25/088 |
| | | | | 296/65.01 |
| 2012/0305327 A1* | 12/2012 | Lambri | ................... | B60G 9/02 |
| | | | | 903/903 |
| 2013/0169019 A1* | 7/2013 | Hisada | ................. | B60N 2/643 |
| | | | | 297/440.1 |
| 2014/0292036 A1* | 10/2014 | Kuroda | ................. | B60N 2/005 |
| | | | | 296/193.07 |
| 2014/0292044 A1 | 10/2014 | Uchiyama et al. | | |
| 2015/0274212 A1* | 10/2015 | Karube | ............... | B62D 25/082 |
| | | | | 296/193.11 |
| 2016/0090015 A1* | 3/2016 | Karube | ................... | B60N 2/38 |
| | | | | 297/475 |
| 2017/0001549 A1* | 1/2017 | Bessho | ................... | B60L 53/80 |
| 2017/0274892 A1* | 9/2017 | Miyashita | ................ | B60K 1/00 |
| 2018/0297641 A1 | 10/2018 | Nada et al. | | |
| 2018/0312025 A1 | 11/2018 | Danielson et al. | | |
| 2019/0092274 A1* | 3/2019 | Nakaji | ..................... | B60K 6/08 |
| 2022/0041080 A1* | 2/2022 | Liong | ..................... | B62D 61/02 |

FOREIGN PATENT DOCUMENTS

| | | | | | |
|---|---|---|---|---|---|
| DE | 102006055815 A1 | * | 5/2008 | ............. | B60N 2/005 |
| ES | 2538303 T3 | * | 6/2015 | ................ | B23P 6/00 |
| FR | 2936485 A1 | * | 4/2010 | ................ | B60N 2/01 |
| GB | 2254588 A | | 10/1992 | | |
| GB | 2282576 A | | 4/1995 | | |
| JP | 2005178782 A | * | 7/2005 | | |
| JP | 2008100608 A | | 5/2008 | | |
| JP | 2008143201 A | | 6/2008 | | |
| JP | 2014118125 A | | 6/2014 | | |
| JP | 2014196061 A | | 10/2014 | | |
| JP | 2018177058 A | | 11/2018 | | |
| JP | 2019059373 A | * | 4/2019 | ............. | B60K 17/00 |
| WO | 9218347 A1 | | 10/1992 | | |
| WO | 2011061585 A2 | | 5/2011 | | |

OTHER PUBLICATIONS

Guillez Jean Marc, Machine Translation of FR 2936485 "Front Cabin of a Motor Vehicle Urban Personnel", IP.com, Apr. 2, 2010 (Year: 2010).*

Nakamura, Normi "Work Vehicle", JP 2005-178782 A, machine translation, ip.com, Jul. 15, 2005 (Year: 2005).*

\* cited by examiner

MULTIPURPOSE WORK VEHICLE

CROSS-REFERENCE TO RELATED APPLICATION

This application claims priority to Japanese Patent Application No. 2019-169569 filed Sep. 18, 2019, the disclosure of which is hereby incorporated by reference in its entirety.

TECHNICAL FIELD

The present invention relates to a multipurpose work vehicle including a driver's seat and an occupant's seat located on a lateral side of the driver's seat.

BACKGROUND ART

As an example multipurpose work vehicle configured as above, JP 2014-118125 A discloses a multipurpose work vehicle including an occupant's compartment at a front portion of the vehicle body, the occupant's compartment including a driver's seat and an occupant's seat ("assistant's seat" in the patent literature) arranged next to each other.

The multipurpose work vehicle of JP 2014-118125 A is configured such that the driver's seat is located at a left end portion of the vehicle body in its width direction and that judging from the drawings, the occupant's seat allows two people to sit thereon.

JP 2008-100608 A discloses a vehicle (although not a multipurpose work vehicle) including (i) a driver's seat at a front portion of the vehicle body, the driver's seat being located at the center in the width direction of the vehicle body, and (ii) two occupant's seats ("assistance seats" in the patent literature) on the opposite sides of the driver's seat, the occupant's seats being offset rearwardly relative to the driver's seat.

SUMMARY OF INVENTION

Technical Problem

A multipurpose work vehicle for farmwork, for example, is used to carry items such as equipment necessary for farmwork, materials of a fence to serve as a boundary of farmland, and fertilizers, as well as workers.

The multipurpose work vehicle disclosed in JP 2014-118125 A includes at a rear portion of the vehicle body a truck box for carrying items such as equipment necessary for farmwork, materials of a fence, and fertilizers. The multipurpose work vehicle includes a driver's seat and an occupant's seat at a front portion of the vehicle body.

Considering movement of people, although the multipurpose work vehicle disclosed in JP 2014-118125 A should be capable of carrying one person on the driver's seat and another person on the occupant's seat, if those people ride next to each other in a lateral direction, they come into contact with each other by the shoulder or arm, which can be a source of discomfort.

In view of the above inconvenience, the vehicle of JP 2008-100608 A, which includes a driver's seat and occupant's seats arranged as described above, may overcome such inconvenience of adjacent people coming into contact with each other by the shoulder or arm and create a comfortable in-vehicle environment. Multipurpose vehicles, however, normally have only a small distance between the driver's seat and the front end of the vehicle body, and do not include a driver's seat and occupant's seats that are arranged as disclosed in JP 2008-100608 A.

The circumstances described above have led to a demand for a multipurpose work vehicle that allows the driver and an occupant to ride comfortably.

Solution to Problem

A multipurpose work vehicle according to one or more embodiments of the present invention comprises: a driver's seat at a center of a vehicle body in a left-right direction of the vehicle body; and an occupant's seat to at least either left or right of the driver's seat in the left-right direction of the vehicle body, wherein the occupant's seat is offset rearwardly relative to the driver's seat.

The above configuration allows an occupant on the occupant's seat to be present rearwardly relative to the driver on the driver's seat. The above configuration thus prevents the driver on the driver's seat from coming into contact with an occupant on the occupant's seat by the shoulder or arm, and thereby prevents both the driver and the occupant from feeling discomfort. The above configuration also allows both the driver and an occupant to easily get in and out of the multipurpose work vehicle without coming into contact with each other. In particular, even for (i) a vehicle (such as a multipurpose vehicle) including a truck box at a rear portion of the vehicle body or (ii) a vehicle which has only a small distance between the driver's seat and the front end of the vehicle body and of which the space for placing the driver's seat and an occupant's seat cannot be enlarged easily, the above arrangement of a driver's seat and an occupant's seat allows an in-vehicle space to be used effectively.

The above configuration thereby provides a multipurpose work vehicle that allows the driver and an occupant to ride comfortably.

The multipurpose work vehicle may further be configured such that the driver's seat includes a seat cushion and a seat back, the occupant's seat includes a seat cushion and a seat back, the seat cushion of the driver's seat is higher in position than the seat cushion of the occupant's seat, the seat back of the occupant's seat is offset rearwardly relative to the seat back of the driver's seat, and the seat back of the driver's seat and the seat back of the occupant's seat are formed integrally as a single member.

The above configuration allows the driver's seat to be located at a high position, and thereby allows the driver on the driver's seat to have a high view and a good forward visibility as a result. The above configuration also allows a space located at the center of the vehicle body in its width direction and below the driver's seat to be used to contain an engine, a transmission device, and/or the like. Further, the seat back of the driver's seat (which is located at the center of the vehicle body in its width direction) and the seat back of the occupant's seat are formed integrally as a single member. This allows the respective backs of the driver and an occupant to be each supported over a large surface as compared to a multipurpose work vehicle including three separate seat backs for a driver's seat and left and right occupant's seats.

The multipurpose work vehicle may further be configured such that the vehicle body has two wheel-containing spaces each for containing a front wheel, the wheel-containing spaces being located respectively at a left front portion and a right front portion of the vehicle body, and in a plan view of the vehicle body, an operation pedal for a driver on the driver's seat to operate is provided between the wheel-containing spaces.

The above configuration involves an operation pedal located in a space between the left and right wheel-containing spaces. This ensures a large space for the driver's feet, and allows the driver to easily depress the operation pedal.

The multipurpose work vehicle may further comprise an engine; and a transmission device, wherein the engine and the transmission device are positioned below the driver's seat and at the center of the vehicle body in the left-right direction of the vehicle body, and are arranged in a front-rear direction of the vehicle body.

The above configuration allows the driver's seat to be located at such a position as to not overlap with the front end of a space in which the engine and the transmission device are present. The above configuration also allows an occupant's seat to be shifted rearwardly relative to the driver's seat by any rearward offset amount.

The multipurpose work vehicle may further comprise a roll-over protective structure (ROPS) frame positioned above and outwardly of the occupant's seat and extending in a front-rear direction of the vehicle body, wherein the ROPS frame includes a grip that an occupant on the occupant's seat is able to hold.

The above configuration allows a person to hold the grip of the ROPS frame for a stable posture when the person gets in the multipurpose work vehicle to sit on the occupant's seat or when the occupant on the occupant's seat gets out of the multipurpose work vehicle.

DESCRIPTION OF EMBODIMENTS

The description below deals with an embodiment of the present invention with reference to drawings.

[Overall Configuration]

Figure 1:
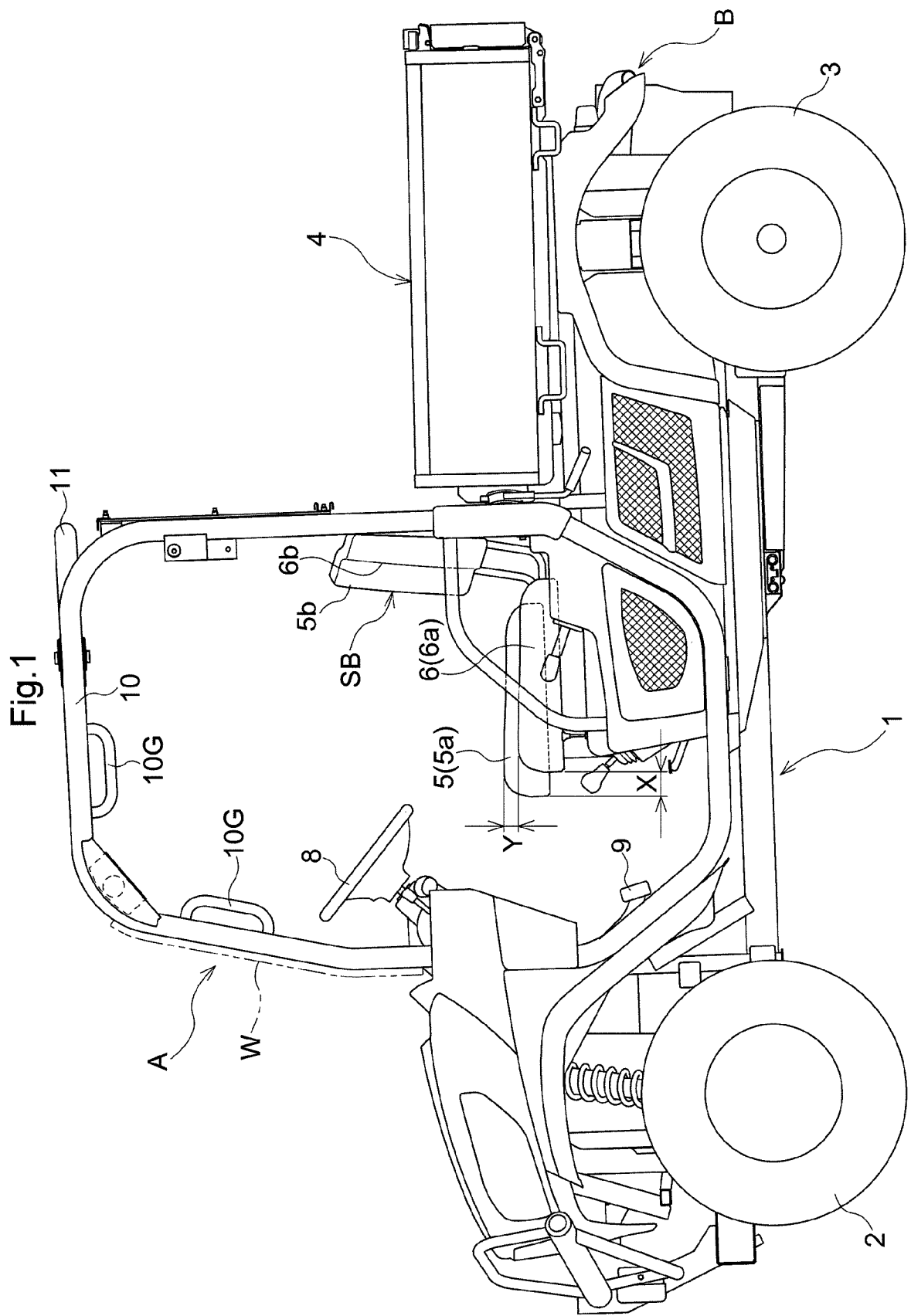
FIG. 1 is a side view of a multipurpose work vehicle.
Figure 2:
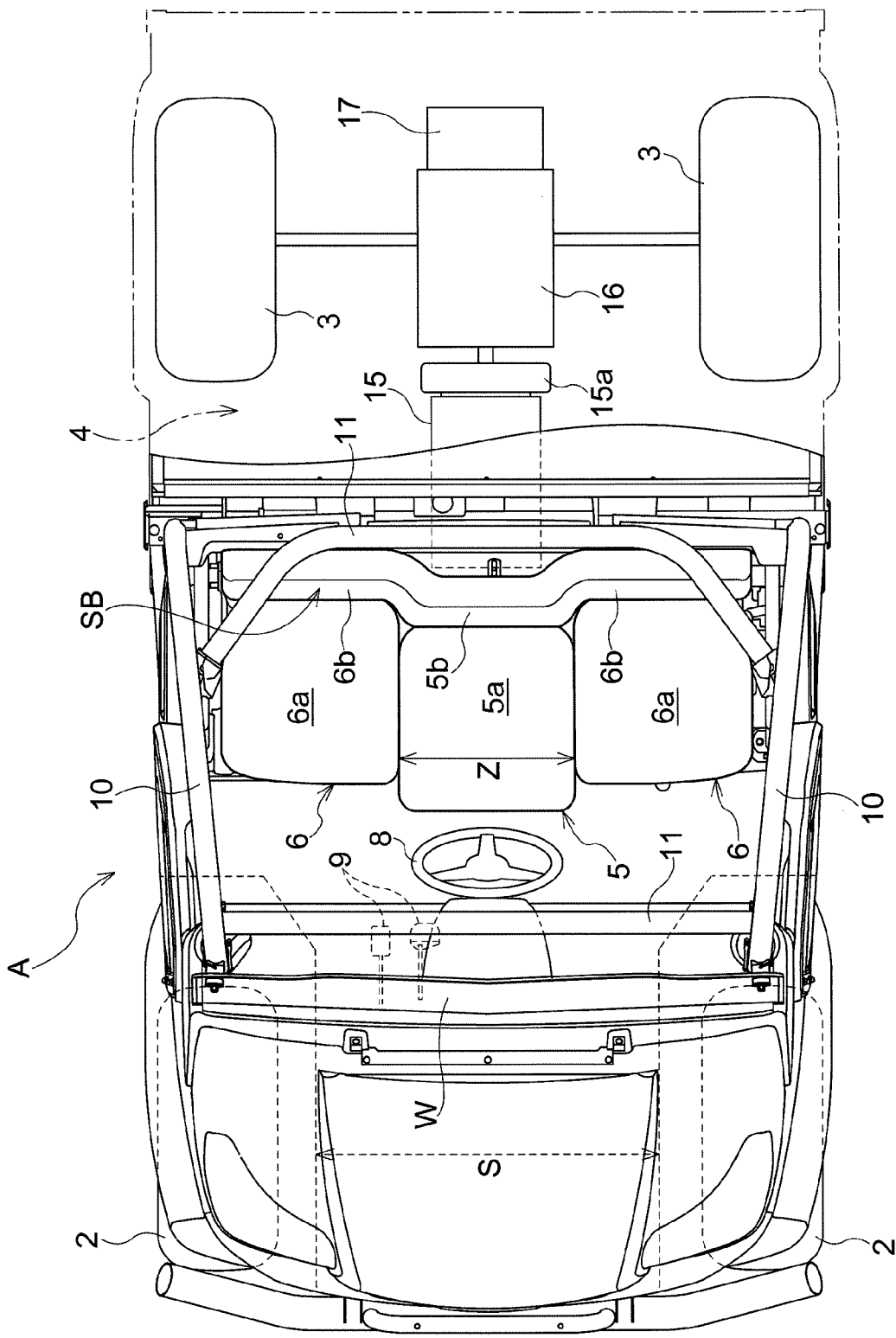
FIG. 2 is a plan view of a multipurpose work vehicle.
Figure 3:
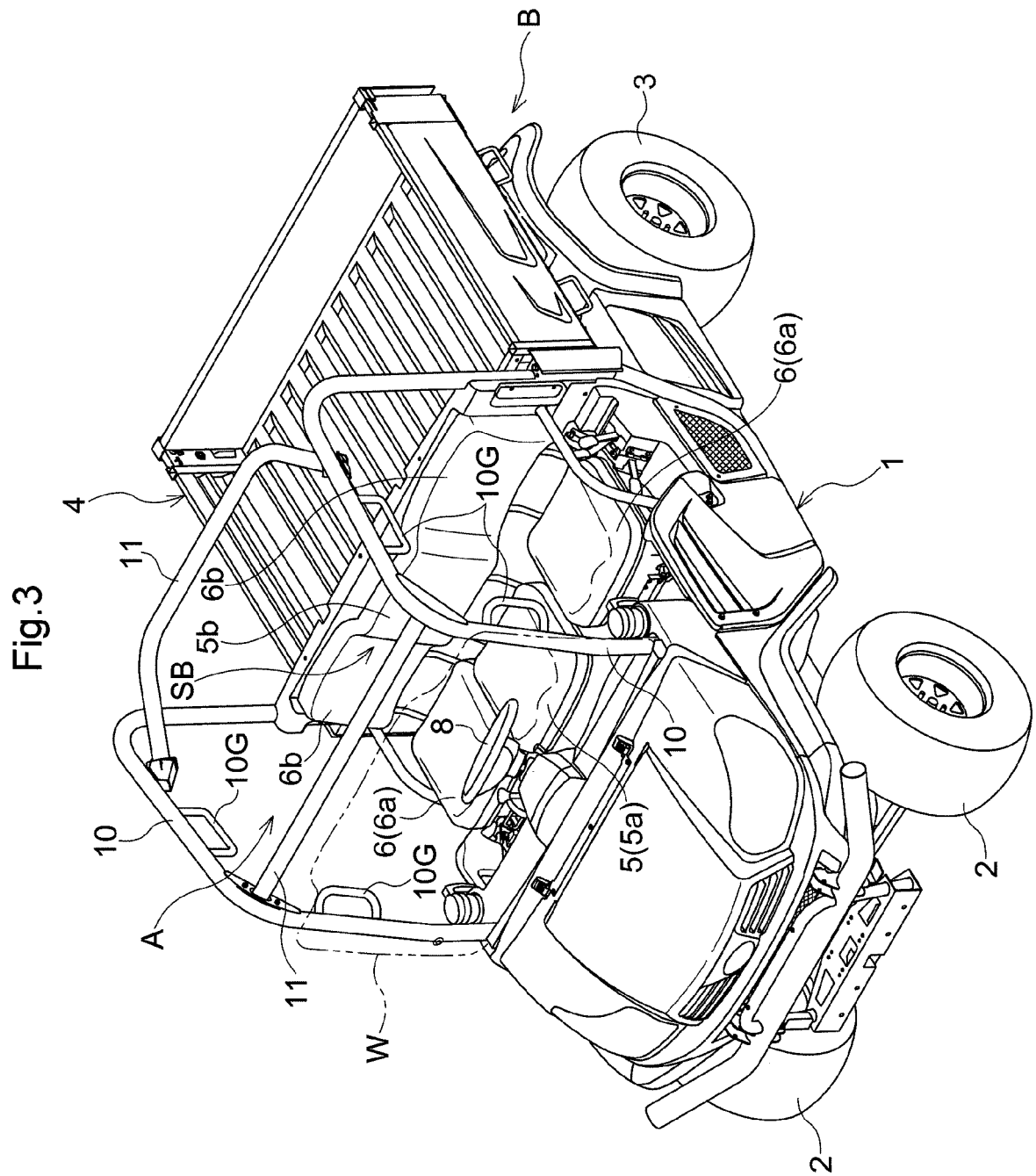
FIG. 3 is a perspective view of a multipurpose work vehicle.

FIGS. 1 to 3 each illustrate a multipurpose work vehicle including a vehicle body 1, a pair of left and right front wheels 2 provided at a front portion of the vehicle body 1, a pair of left and right rear wheels 3 at a rear portion of the vehicle body 1, a driving part A at a central portion of the vehicle body 1, a truck box 4 at a rear portion of the vehicle body 1, and a motor part B under the truck box 4.

The multipurpose work vehicle is a four-wheel drive vehicle (in which the motor part B transmits a driving force to both the front wheels 2 and the rear wheels 3). The multipurpose work vehicle is a utility vehicle designed to be used for multiple purposes such as farmwork and transportation. The truck box 4 is configured such that a front portion thereof can be lifted for a slanted position in response to an operation of a dump cylinder (not shown in the drawings) to allow a load to be dumped rearwardly by its self weight.

[Driving Part]

The driving part A includes a driver's seat 5 for a driver to sit on which driver's seat 5 is located at the center of the vehicle body in its left-right direction, two occupant's seats 6 to the left and right of the driver's seat 5, and a seat back part SB provided rearwardly of the driver's seat 5 and the occupant's seats 6 for both the driver's seat 5 and the occupant's seats 6. The driving part A also includes a steering wheel 8 provided in front of the driver's seat 5 for steering the left and right front wheels 2 and a plurality of operation pedals 9 in front and downwardly of the driver's seat 5. The operation pedals 9 are a general name for pedals such as an accelerator pedal and a brake pedal, and may include a clutch pedal and a parking brake pedal.

The driving part A includes ROPS frames 10 at left and right positions to protect the driver and any occupant in the event of a roll-over accident of the multipurpose work vehicle. The left and right ROPS frames 10 each include a bar-shaped member that is bent in such a shape as to extend from a front portion of the driving part A over to a rear portion thereof and that is present in a region extending in the front-rear direction. The ROPS frames 10 have respective upper portions extending in the front-rear direction with which upper portions reinforcing frames 11 are connected for increased strength. The left and right ROPS frames 10 each include a plurality of grips 10G for a driver or occupant to hold when getting in or out of the multipurpose work vehicle. The plurality of grips 10G are each present at such a position as to allow an occupant on an occupant's seat 6 to reach and hold the grip 10G.

As illustrated in FIGS. 1 to 3, the multipurpose work vehicle includes a windshield W attached to respective column portions of the left and right ROPS frames 10 which column portions are each located at a front portion of the corresponding ROPS frame 10. FIGS. 1 and 3 each show a chain double-dashed line to indicate the windshield W.

As illustrated in FIG. 2, the motor part B includes at a central portion of the vehicle body in the left-right direction an engine 15, a flywheel 15a, a transmission case 16, and a continuously variable transmission device 17 in this order from forward to rearward. The motor part B has the following driving structure: The engine 15 produces a driving force, which is varied non-stepwise by a hydrostatic, continuously variable transmission device. The driving force varied as such is transmitted from the transmission case 16 to the left and right rear wheels 3 and the left and right front wheels 2.

The multipurpose work vehicle is configured such that in order to prevent the driver's seat 5 from inconveniently coming into contact with a front end portion of the engine 15 or interfering with equipment accessory to the engine 15, the driver's seat 5 is positioned in front and upwardly of the engine 15, and the left and right occupant's seats 6 are offset rearwardly relative to the driver's seat 5 and are lower in position than the driver's seat 5. In particular, the engine 15 is absent behind the left and right occupant's seats 6 in a plan view, so that the left and right occupant's seats 6 offset rearwardly do not come into contact with the engine 15.

[Seat Arrangement]

As illustrated in FIGS. 1 to 3, the driver's seat 5 includes a center seat cushion 5a for the driver to sit on and a center seat back 5b behind the driver on the center seat cushion 5a. Each occupant's seat 6 includes a side seat cushion 6a for an occupant to sit on and a side seat back 6b behind an occupant on the side seat cushion 6a.

As illustrated in FIG. 1, each side seat cushion 6a is shifted rearwardly relative to the center seat cushion 5a by an offset amount X. Further, the center seat cushion 5a is shifted upwardly relative to each side seat cushion 6a by a shift amount Y. This positional relationship between the center seat cushion 5a and each side seat cushion 6a is a relationship in relative position.

The seat back part SB is an integrated whole of a lateral series of (i) the center seat back 5b, which is located at the center in the left-right direction, and (ii) the left and right side seat backs 6b, which are on the opposite sides of and in contact with the center seat back 5b. Each side seat back 6b is shifted rearwardly relative to the center seat back 5b by a distance equal to the offset amount X mentioned above. This positional relationship between the center seat back 5b and each side seat back 6b is a relationship in relative position.

As illustrated in FIG. 2, the center seat cushion 5a has a width Z substantially equal to each of the respective widths of the left and right side seat cushions 6a.

As illustrated in FIG. 2, the vehicle body 1 has a front portion with left and right wheel-containing spaces for containing the respective front wheels 2. The wheel-containing spaces each have a width so large as to allow the corresponding front wheel 2 to change its orientation in response to a steering operation. As a result, the space sandwiched between the left and right wheel-containing spaces is a space that is located at a front portion of the vehicle body 1 which front portion is at the center of the vehicle body 1 in its width direction and that has a limited space width S. The operation pedals 9 are located within the space width S. The center seat cushion 5a has been adjusted in position so that the width Z is within the space width S as viewed in the front-rear direction of the vehicle body.

The wheel-containing spaces are each located forwardly and downwardly of the corresponding one of the left and right occupant's seats 6. When an occupant sits on an occupant's seat 6, the occupant's feet are close to a rear wall portion of a wheel-containing space. The multipurpose work vehicle is, in view of that, configured as described above such that the occupant's seats 6 are offset rearwardly relative to the driver's seat 5. This configuration increases the front-rear distance between each occupant's seat 6 and the rear wall portion of a wheel-containing space, with the result of an increased space for the occupant's feet.

The multipurpose work vehicle accommodates a total of three people: one driver and two occupants. The multipurpose work vehicle also includes ROPS frames 10 with grips 10G to allow the driver and occupants to hold a grip 10G and thereby get in or out of the driving part A with a normal posture.

Function Effects of Embodiment

Suppose a multipurpose work vehicle including, for example, a linearly aligned arrangement of three seats in the lateral direction of the vehicle body to accommodate three people. Such a multipurpose work vehicle may let the driver on the driver's seat 5 come into contact with an occupant on an occupant's seat 6 by the shoulder or arm, thereby causing each of the driver and the occupant to feel discomfort from the other. Further, with a linearly aligned arrangement of three seats in the lateral direction of the vehicle body, the rear wall portion of each wheel-containing space is close in the front-rear direction to the corresponding one of the left and right seats among the three seats.

In view of the above, the multipurpose work vehicle of the present embodiment includes a driver's seat 5 at the center of the vehicle body in its left-right direction and occupant's seats 6 to the left and right of the driver's seat 5, the occupant's seats 6 being offset rearwardly relative to the driver's seat 5. This prevents the driver on the driver's seat 5 from coming into contact with an occupant on an occupant's seat 6 by the shoulder or arm without increasing the length of the vehicle body 1. The above seat arrangement increases the front-rear distance between each of the left and right occupant's seats 6 and the rear wall portion of a wheel-containing space, with the result of an increased space for the feet of an occupant on an occupant's seat 6. The above seat arrangement also allows both the driver and an occupant to easily get in and out of the multipurpose work vehicle without coming into contact with each other.

The above configuration eliminates the need for, for example, the engine 15 and the transmission case 16 to be positioned rearwardly of the driving part A, and thereby eliminates the need to design a vehicle body 1 with an increased length.

With the above configuration, the driver's seat 5, which is located at the center of the vehicle body in its left-right direction, is located rearwardly of the space between the left and right wheel-containing spaces and within the space width S. This ensures a large space for the feet of the driver on the driver's seat 5, and also provides a space enough for the operation pedals 9.

The multipurpose work vehicle accommodates a total of three people, namely the driver on the driver's seat 5 and two occupants, the driver's seat 5 being located at the center of the vehicle body in its left-right direction and at a high position. This ensures a good forward visibility, and thus allows the driver to recognize the central position of the traveling multipurpose work vehicle and steer the multipurpose work vehicle accurately while driving the multipurpose work vehicle. The multipurpose work vehicle also includes ROPS frames 10 with grips 10G to allow both the driver and an occupant to hold a grip 10G and thereby get in or out of the driving part A with a normal posture.

Other Embodiments

The present invention may alternatively be arranged as below other than the embodiment described above. Any member below that is identical in function to a particular member described for the above embodiment has the same reference member.

Figure 4:
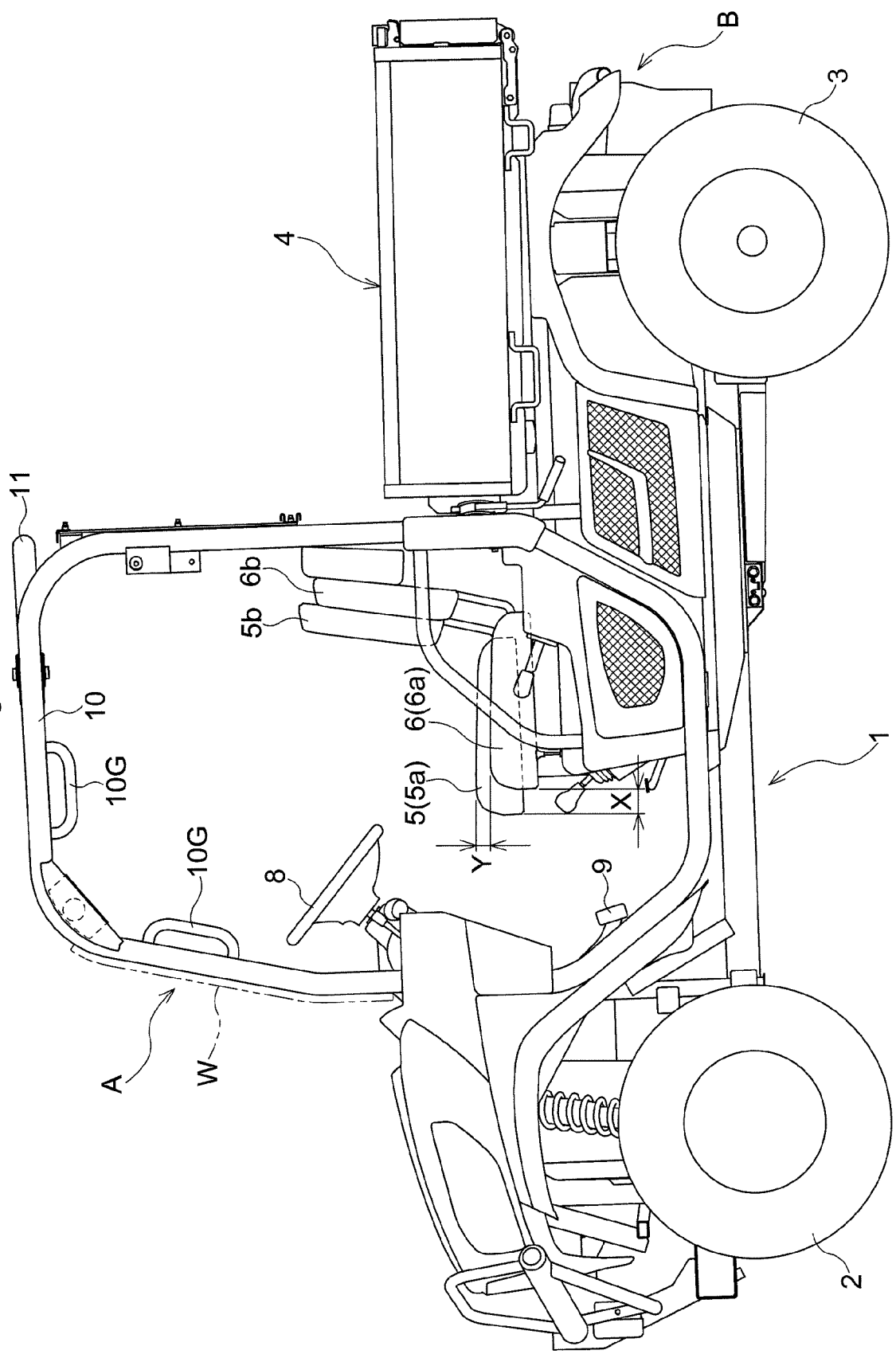
FIG. 4 is a side view of a multipurpose work vehicle as another embodiment (a).
Figure 5:
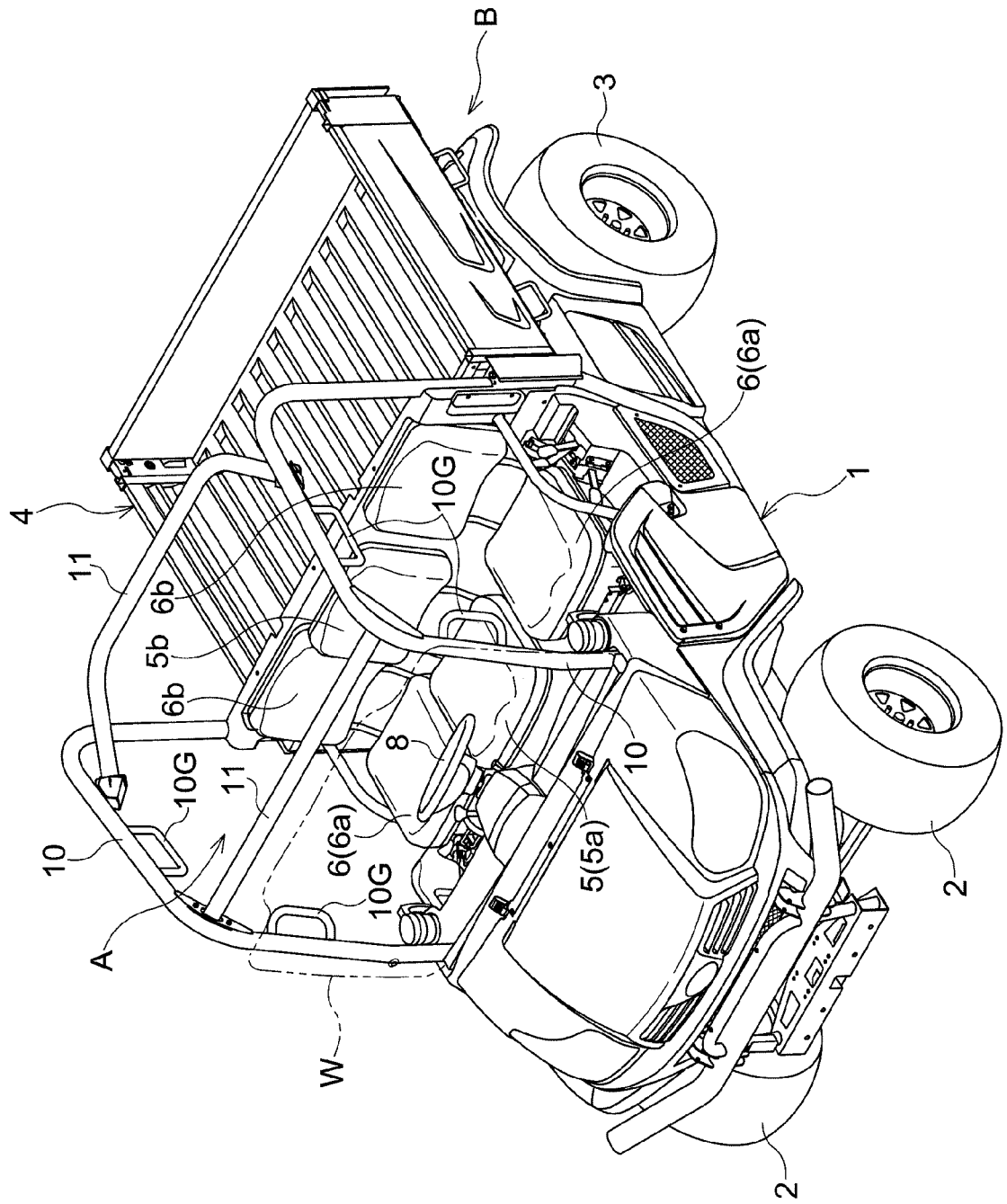
FIG. 5 is a perspective view of the multipurpose work vehicle as the other embodiment (a).

(a) As illustrated in FIGS. 4 and 5, the driving part A includes (i) a driver's seat 5 for a driver to sit on which driver's seat 5 is located at the center of the vehicle body in its left-right direction and (ii) two occupant's seats 6 to the left and right of the driver's seat 5. The driver's seat 5 includes a center seat cushion 5a and a center seat back 5b. The left and right occupant's seats 6 each include a side seat cushion 6a and a side seat back 6b.

The other embodiment (a) is similar to the embodiment described above in that each side seat cushion 6a is shifted rearwardly relative to the center seat cushion 5a by an offset amount X, that the center seat cushion 5a is shifted upwardly relative to each side seat cushion 6a by a shift amount Y, and that each side seat back 6b is shifted rearwardly of the center seat back 5b by a distance equal to the offset amount X mentioned above.

The other embodiment (a) differs from the above-described embodiment in that the seat back part SB is replaced with a center seat back 5b and two side seat backs 6b that are independent of one another. This allows the driver on the driver's seat 5 and occupants on the left and right occupant's seats 6 to sit more independently of one another.

Figure 6:
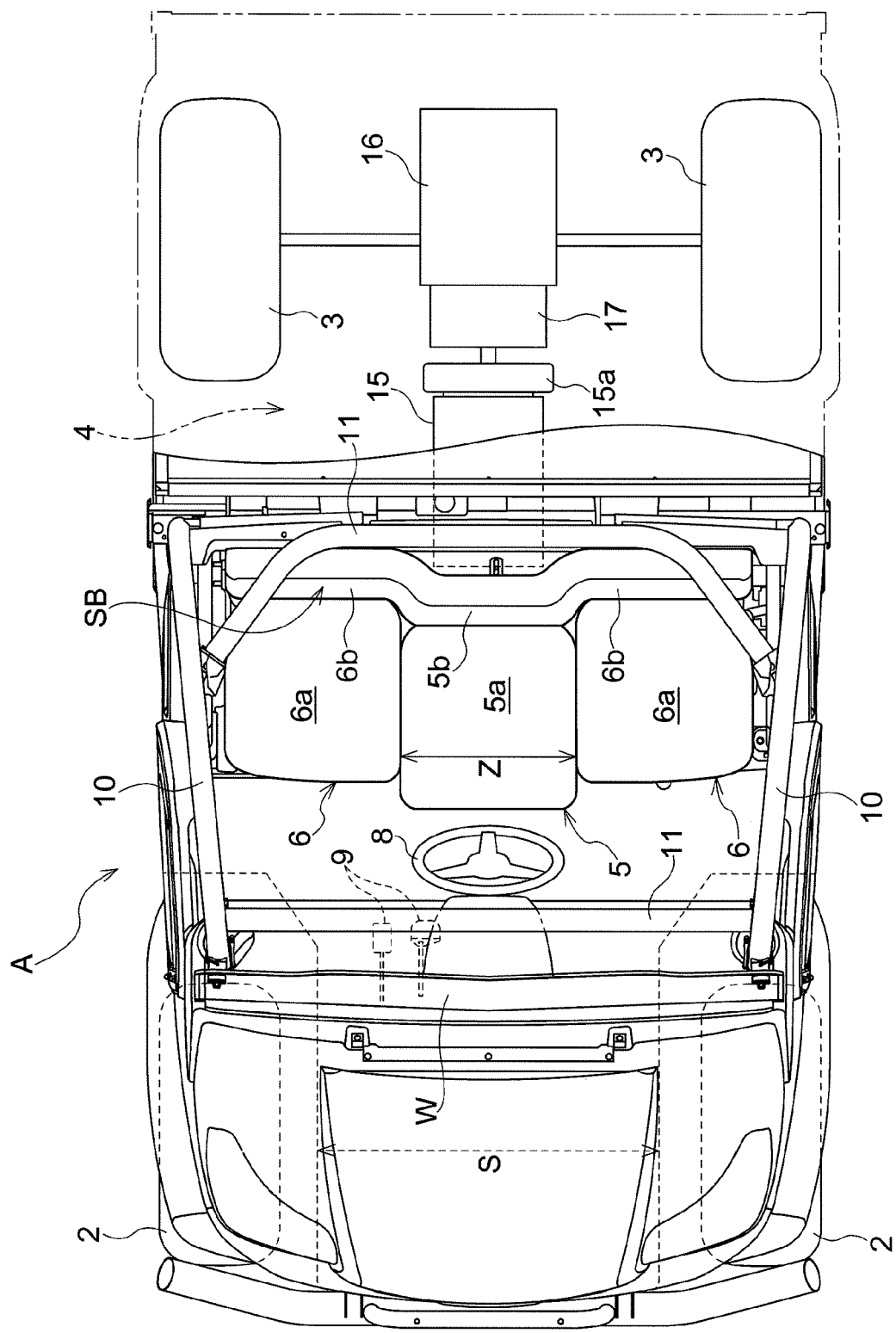
FIG. 6 is a plan view of a multipurpose work vehicle as another embodiment (b).

(b) As illustrated in FIG. 6, this embodiment is similar to the above-described embodiment in that the driving part A includes (i) a driver's seat 5 for a driver to sit on which driver's seat 5 is located at the center of the vehicle body in its left-right direction and (ii) two occupant's seats 6 to the left and right of the driver's seat 5, that the occupant's seats 6 are offset rearwardly relative to the driver's seat 5, and that the seat cushion 5a for the driver's seat 5 is shifted upwardly.

The other embodiment (b) is particular in that the motor part B includes an engine 15, a flywheel 15a, a continuously variable transmission device 17, and a transmission case 16 in this order from forward to rearward. The motor part B is configured as follows: The engine 15 produces a driving force, which is varied non-stepwise by a hydrostatic, continuously variable transmission device. The driving force varied as such is transmitted from the transmission case 16 to the left and right rear wheels 3 and the left and right front wheels 2.

(c) This embodiment includes a single occupant's seat 6 to only the left or right of the driver's seat 5. The embodiment described above is a multipurpose work vehicle that accommodates three people. This embodiment is, in contrast, a multipurpose work vehicle including, for example, a single occupant's seat 6 in only the leftward or rightward direction of the driving part A so as to accommodate two people.

Specifically, the multipurpose work vehicle of this embodiment may have a space on that side of the driver's seat 5 which is opposite to the single occupant's seat 6, the space being, for example, a space in which to place a load or the like. This configuration similarly prevents the driver and an occupant from coming into contact with each other by the shoulder or arm.

(d) This embodiment includes a driver's seat 5 at the center of the vehicle body in its left-right direction and two occupant's seats 6 to the left and right of the driver's seat 5 to accommodate three people, the left and right occupant's seats 6 being positioned to have respective rearward offset amounts X different from each other.

The other embodiment (d) may be configured such that the left and right occupant's seats 6 are adjustable in position in the front-rear direction (that is, their respective offset amounts X are adjustable).

(e) This embodiment is configured such that the shift amount Y is adjustable, that is, the center seat cushion 5a is adjustable in height relative to each side seat cushion 6a. This configuration allows the height of the center seat cushion 5a to be adjusted not only in correspondence with the build of the driver but also to provide a better view for the driver.

INDUSTRIAL APPLICABILITY

The present invention is applicable to a multipurpose work vehicle including a driver's seat and an occupant's seat located on a lateral side of the driver's seat.

REFERENCE SIGNS LIST

1 Vehicle body
2 Front wheel
5 Driver's seat
5a Center seat cushion
6 Occupant's seat
6a Side seat cushion
9 Operation pedal
10 ROPS frame
10G Grip
15 Engine
16 Transmission device

The invention claimed is:

1. A multipurpose work vehicle, comprising:
   a driver's seat at a center of a vehicle body in a left-right direction of the vehicle;
   a left occupant's seat disposed to left of the driver's seat and a right occupant's seat disposed to right of the driver's seat in the left-right direction of the vehicle body;
   a truck box positioned rearward of the driver's seat and the left and right occupant's seats;
   an engine;
   a flywheel;
   a transmission case; and
   a continuously variable transmission device,
   wherein the driver's seat includes a seat cushion and a seat back, and the left and right occupant's seats include a seat cushion and a seat back,
   wherein the occupant's seats are offset rearwardly relative to the driver's seat, the seat backs of the respective left and right occupant's seats are offset rearwardly relative to the seat back of the driver's seat, and the engine and the transmission case are positioned below the driver's seat and the truck box and at the center of the vehicle body in the left-right direction of the vehicle body, and are arranged in a front-rear direction of the vehicle body without overlapping each other as viewed from above,
   wherein the engine, the flywheel, the transmission case and the continuously variable transmission device are arranged in this order from forward to rearward,
   wherein, in a plan view, a front end of the engine is positioned forward of rear ends of the seat backs of the respective left and right occupant's seats and rearward of the seat back of the driver's seat,
   wherein roll-over protective structure (ROPS) frames are positioned above the driver's seat and the left and right occupant's seats and laterally outwardly of the driver's seat and the left and right occupant's seats and extend in a front-rear direction of the vehicle body,
   wherein a reinforcing frame extends laterally and is connected to the left and right ROPS frames, and
   wherein, in a plan view, the seat backs of only the left and right occupant's seats, from among the driver's seat and the left and right occupant's seats, partially overlap the reinforcing frame, and only the engine from among the engine, the flywheel, the transmission case, and the continuously variable transmission device partially overlaps the reinforcing frame.

2. The multipurpose work vehicle according to claim 1, wherein
   the seat cushion of the driver's seat is higher in position than the seat cushion of the left and right occupant's seats, and
   the seat back of the driver's seat and the seat backs of the respective left and right occupant's seats are formed integrally as a single member.

3. The multipurpose work vehicle according to claim 1, wherein
   the vehicle body has two wheel-containing spaces each for containing a front wheel, the wheel-containing spaces being located respectively at a left front portion and a right front portion of the vehicle body, and
   in a plan view of the vehicle body, an operation pedal for a driver on the driver's seat to operate is provided between the wheel-containing spaces.

4. The multipurpose work vehicle according to claim 1, wherein the ROPS frame includes a grip that an occupant on the left occupant's seat or the right occupant's seat is able to hold.

5. A multipurpose work vehicle, comprising:
a driver's seat at a center of a vehicle body in a left-right direction of the vehicle;
a left occupant's seat disposed to left of the driver's seat and a right occupant's seat disposed to right of the driver's seat in the left-right direction of the vehicle body;
a truck box positioned rearward of the driver's seat and the left and right occupant's seats;
an engine;
a flywheel;
a transmission case; and
a continuously variable transmission device,
wherein the driver's seat includes a seat cushion and a seat back, and the left and right occupant's seats include a seat cushion and a seat back,
wherein the left and right occupant's seats are offset rearwardly relative to the driver's seat, the seat backs of the respective left and right occupant's seats are offset rearwardly relative to the seat back of the driver's seat, and the engine and the transmission case are positioned below the driver's seat and the truck box and at the center of the vehicle body in the left-right direction of the vehicle body, and are arranged in a front-rear direction of the vehicle body without overlapping each other as viewed from above,
wherein the engine, the flywheel, the continuously variable transmission device and the transmission case are arranged in this order from forward to rearward,
wherein, in a plan view, a front end of the engine is positioned forward of rear ends of the seat backs of the respective left and right occupant's seats and rearward of the seat back of the driver's seat,
wherein roll-over protective structure (ROPS) frames are positioned above the driver's seat and the occupant's seats and laterally outwardly of the driver's seat and the left and right occupant's seats and extend in a front-rear direction of the vehicle body,
wherein a reinforcing frame extends laterally and is connected to the left and right ROPS frames, and
wherein, in a plan view, the seat backs of only the left and right occupant's seats, from among the driver's seat and the left and right occupant's seats, partially overlap the reinforcing frame, and only the engine from among the engine, the flywheel, the continuously variable transmission device, and the transmission case partially overlaps the reinforcing frame.

6. The multipurpose work vehicle according to claim 5, wherein
the seat cushion of the driver's seat is higher in position than the seat cushion of the left and right occupant's seats, and
the seat back of the driver's seat and the seat backs of the respective left and right occupant's seats are formed integrally as a single member.

7. The multipurpose work vehicle according to claim 5, wherein
the vehicle body has two wheel-containing spaces each for containing a front wheel, the wheel-containing spaces being located respectively at a left front portion and a right front portion of the vehicle body, and
in a plan view of the vehicle body, an operation pedal for a driver on the driver's seat to operate is provided between the wheel-containing spaces.

8. The multipurpose work vehicle according to claim 5, wherein the ROPS frame includes a grip that an occupant on the left occupant's seat or the right occupant's seat is able to hold.

9. The multipurpose work vehicle according to claim 1,
wherein the reinforcing frame is curved rearwardly and includes: left and right slanting reinforcing parts extending slantingly rearward from the respective ROPS frames; and a lateral reinforcing part extending laterally, and
wherein, in a plan view, the seat backs of the respective left and right occupant's seats partially overlap the respective slanting reinforcing parts.

10. The multipurpose work vehicle according to claim 5,
wherein the reinforcing frame is curved rearwardly and includes: left and right slanting reinforcing parts extending slantingly rearward from the respective ROPS frames; and a lateral reinforcing part extending laterally, and
wherein, in a plan view, the seat backs of the respective left and right occupant's seats partially overlap the respective slanting reinforcing parts.

* * * * *